Figure 1:
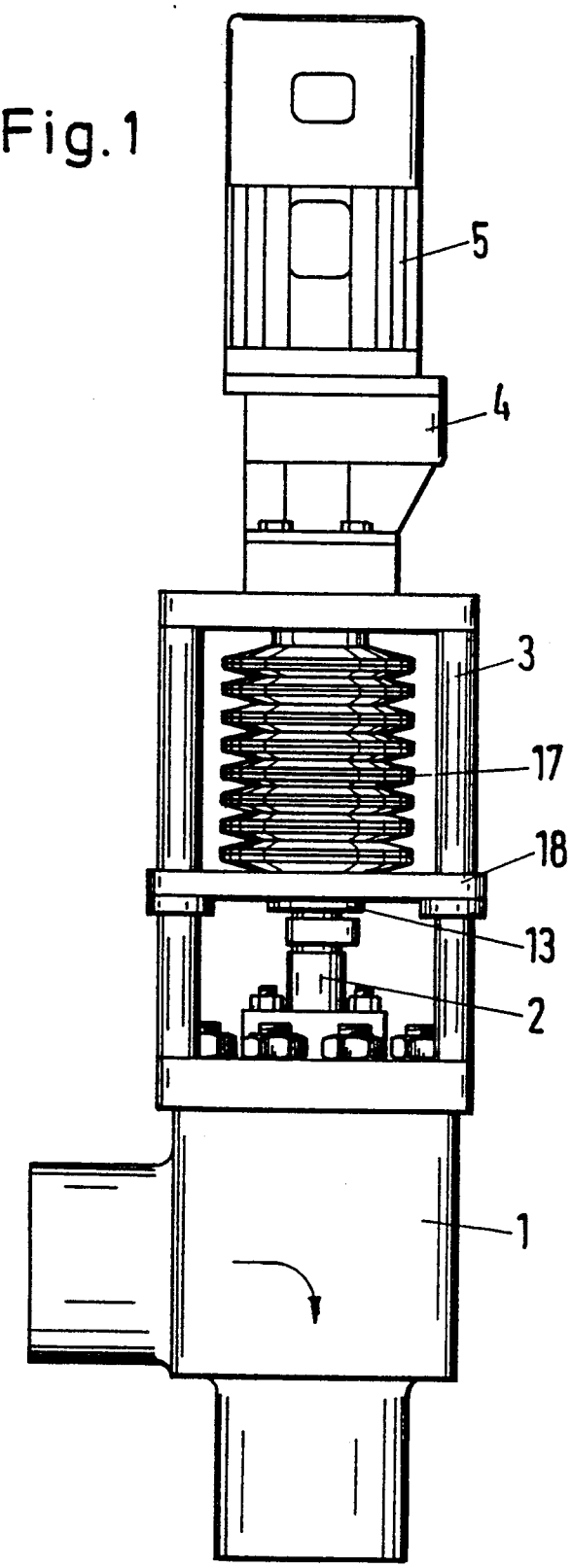

United States Patent [19]

Strache

[11] Patent Number: 4,997,069
[45] Date of Patent: Mar. 5, 1991

[54] ELECTROMOTIVE DRIVE FOR A CONTROL ELEMENT

[75] Inventor: Wilhelm Strache, Bremen, Fed. Rep. of Germany

[73] Assignee: GESTRA Aktiengesellschaft, Bremen, Fed. Rep. of Germany

[21] Appl. No.: 400,590

[22] Filed: Aug. 30, 1989

[30] Foreign Application Priority Data

Nov. 22, 1988 [DE] Fed. Rep. of Germany ....... 3839317

[51] Int. Cl.⁵ .................... F16K 31/00; F16H 25/08
[52] U.S. Cl. .................... 192/0.02 R; 74/89.15; 74/424.8 VA; 251/69; 251/71
[58] Field of Search ................. 192/0.02 R; 74/424.8 VA, 89.15; 251/69, 70, 71

[56] References Cited

U.S. PATENT DOCUMENTS

| | | | |
|---|---|---|---|
| 2,930,571 | 3/1960 | Vogl | 251/69 |
| 3,080,952 | 3/1963 | Carlstedt | 192/0.02 |
| 3,258,985 | 7/1966 | Jordan | 192/0.02 X |
| 3,640,140 | 2/1972 | Gulick et al. | 74/424.8 VA |
| 3,685,790 | 8/1972 | Crowe | 251/69 X |
| 4,090,589 | 5/1978 | Fitzwater | 251/71 X |

OTHER PUBLICATIONS

Lueger Lexikon der Technik, pp. 137–138, Ehrhardt and Franke (1960).

*Primary Examiner*—Richard Lorence
*Attorney, Agent, or Firm*—Collard, Roe & Galgano

[57] ABSTRACT

There is provided an electromotive drive for a control element, the overall drive is without self-inhibition, for which purpose its screw transmission has rolling elements in the thread, and the drive motor is a rotating field magnet. Provision is made for a freewheel clutch disposed between the drive motor and the screw transmission. A non-inhibiting reduction gear may be arranged between the freewheel clutch and the drive motor.

3 Claims, 2 Drawing Sheets

ELECTROMOTIVE DRIVE FOR A CONTROL ELEMENT

The present invention relates to an electromotive drive for a control element and, more particularly, it relates to an electromotive drive for a control element where, upon interruption of the electromotive drive, the control element assumes a safe operating position.

It is often necessary with certain equipment that control elements be provided which react quickly to assume a safe operating position under dangerous operating conditions or, in the event of failure of auxiliary energy. In such cases, use is made of, for example, quick-action shutoff or release valves.

In a known electromotive drive for such control elements, disclosed in German Pat. No. 26 43 550, the operating shaft of the control element is connected with the drive by means of an electromagnetic clutch. When required, the clutch separates the operating shaft from the drive. This permits the return spring to displace or shift the control element into the safe operating position within the necessary short time, which results in a space between the two halves of the electromagnetic clutch. As a result, the drive is not able to actuate the control element for driving it from its safe operating position. The drive must first be displaced or shifted to the operating shaft so that the two halves of the clutch can engage each other again.

It is, therefore, the object of the present invention to provide an electromotive drive of the type described above that is capable of actuating and driving the control element from its safe operating position without first engaging the drive with the control element operating shaft.

The above object is accomplished in accordance with the present invention by providing an electromotive device for a control element having a stroke movably operating shaft which quickly reacts, when required, to assume a safe operating position, the drive including a rotating field magnet drive motor, a screw transmission with a nut and spindle, one of which being driven by the drive motor and the other having connecting means for the operating shaft of the control element, in the screw thread, rolling elements between the spindle and nut, a freewheel clutch between the screw transmission and the drive motor, a return spring for the operating shaft, and a bearing means connected to the control element.

The screw transmission operates with particular ease because of the rolling elements in the thread, for example, rotating balls. This permits the return spring, when the drive motor is currentless, to move the operating shaft together with the drive into the safe operating position within the short reaction time required. The automatic freewheel clutch permits the drive motor to slow down after the control element has reached the safe operating position. The drive motor momentum produced during this rapid movement is consumed by after-running, so that no harmful high loads occur in the drive. Under operating conditions, the rotating field magnet is capable of maintaining the control element in the intended operating position, which is the terminal position opposite the safe operating position, even though the total drive is without self-inhibition. No electromagnetic clutch is required between the operating shaft and the screw transmission, which eliminates the drawback of having clutch halves that become spatially separated from each other.

Other objects and features of the present invention will become apparent from the following detailed description considered in connection with the accompanying drawings. It is to be understood, however, that the drawings are designed as an illustration only and not as a definition of the limits of the invention.

Figure 2:
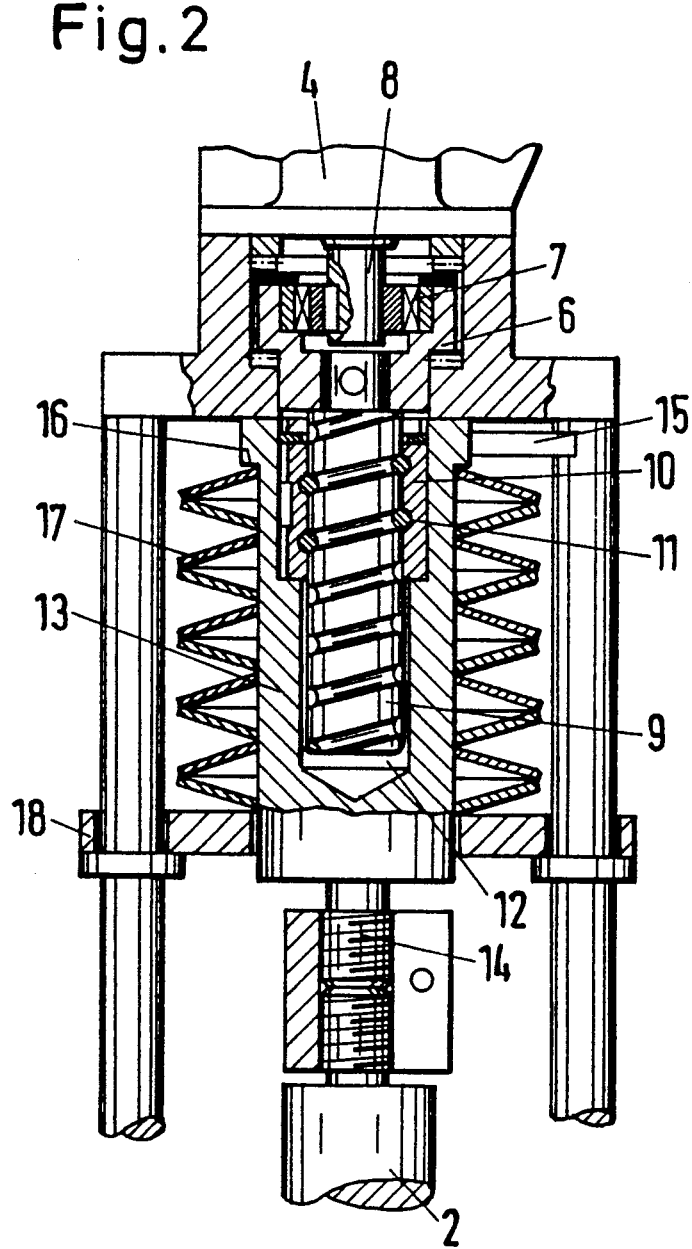

In the drawings, wherein similar reference characters denote similar elements throughout the two views:

FIG. 1 is a perspective side view of a control element with drive according to the present invention; and, FIG. 2 is a longitudinal cross-sectional view of the drive of FIG. 1.

Now turning to the drawings, there is shown in FIG. 1, a control element 1 designed as an OPEN/CLOSED valve having an operating shaft 2, which is stroke movable and stroke adjusted by an electromotive drive. The electromotive drive includes bearing means 3 which, at one end, is connected with the control element 1 and at its other end, supports a reduction gear 4 connected to a drive motor 5.

In FIG. 2, there is shown at the end of bearing means 3, removed from control element 1, a bearing bushing 6 rotatably supported thereon and axially fixed. On its one end, bushing 6 supports a freewheel clutch 7, which is coupled with driven shaft 8 of reduction gear 4. On its other end, bush 6 supports a spindle 9, which extends in the direction toward control element 1 and forms a screw transmission jointly with nut 10 arranged on said spindle. Rolling elements 11, for example, rotating balls, are arranged between spindle 9 and nut 10 in the threads of the nut. Nut 10 is arranged in a longitudinal bore 12 of a lifting shaft 13 which, on its end on the side of the control element, has connection means 14 for operating shaft 2. On its other end, lifting shaft 13 has an anti-rotation lock 15, as well as a driver 16, for a return spring 17 surrounding lifting shaft 13. Return spring 17 consists of a column of plate springs stacked one on top of the other, which is supported on an abutment 18 mounted on bearing means 3.

Drive motor 5 is designed as a rotating field magnet. Both reduction gear 4 and screw drive mechanism 9-11 are designed to be non-inhibiting, meaning that they are free from self-inhibition. Screw transmission mechanism 9-11 operates with special ease because of rolling elements 11.

FIGS. 1 and 2 show the safe operating position of control element 1. Operating shaft 2 and lifting shaft 13 are in the top end position, which is limited by bearing means 3 of control element 1, such position being, for example, the OPEN-position when drive motor 5 is without current.

When drive motor 5 is switched on, it commences the rotation of spindle 9 via reduction gear 4, freewheel clutch 7 and bushing 6, causing nut 10, which is secured against rotation, and its lifting shaft 13, to slide downward on spindle 9. This compresses return spring 17. At the same time operating shaft 2 is stroke adjusted until control element 1 has assumed its operating position, for example, the CLOSED-position, and the stroke motion is limited. Drive motor 5, which continues to be supplied or fed with current, maintains control element 1 in the operating position.

When drive motor 5 becomes de-energized, the force applied to lifting shaft 13 and nut 10 by return spring 17 via driver 16 starts to rotate spindle 9, bushing 6, freewheel clutch 7, reduction gear 4 and drive motor 5. Nut 10 slides upward on spindle 9. The safe operating position is reached after a very short time. This ends the lifting motion of nut 10 and lifting shaft 13. Freewheel clutch 7 separates at the same moment, so that reduction gear 4 and drive motor 5 can slow down until their centrifugal energy or momentum is consumed. Abrupt braking of drive motor 5 and reduction gear 4 is avoided, and high strains in the drive caused by any such abrupt braking are avoided as well.

Upon breaking of the current feed to drive motor 5, control element 1 thus assumes the safe operating position in the shortest possible time under the action of return spring 17. From this safe operating position, control element 1 can be driven again into the operating position by merely feeding drive motor 5 with current.

If necessary, the drive can be designed in such a way that return spring 17 acts in the opposite direction. For this purpose, its end removed from the control element has to be supported on the abutment 18, whereas the end of the spring near the control element acts on lifting shaft 13.

While only a single embodiment of the present invention has been shown and described, it will be obvious that many changes and modifications may be made thereunto without departing from the sphere and scope of the invention.

What is claimed is:

1. An electromotive drive for a control element having a stroke movable operating shaft and adapted to react quickly to assume a safety position, comprising:
    a drive motor;
    a screw transmission including threaded spindle and nut, one of which is driven by the drive motor, and the other is connected by connecting means to the operating shaft, the screw transmission further including rolling elements in the thread of said nut;
    a clutch arranged between the screw transmission and the drive motor;
    a return spring acting on said operating shaft;
    bearing means connected with the control element and supporting the screw transmission, the drive motor, and an abutment for the return spring;
    wherein said clutch is an automatic freewheel clutch, and said drive motor is a rotating-field magnet; and
    a non-inhibiting speed reduction gearing arranged between the drive motor and the freewheel clutch.

2. The electromotive drive as defined in claim 1, which further comprises a bearing bushing rotatably supported at the end of said bearing means remote from the control element, said bearing bushing supporting said freewheel clutch on the end facing the drive motor and said spindle on the end facing the control element.

3. The electromotive drive as defined in claim 1, which further comprises a lifting shaft extending lengthwise through said return spring, said lifting shaft having a longitudinal bore and, at its end on the side of the control element, the connecting means for said operating shaft and said nut being arranged in said longitudinal bore.

* * * * *